United States Patent
Forbes

(10) Patent No.: US 10,429,800 B2
(45) Date of Patent: Oct. 1, 2019

(54) LAYERED APPROACH TO ECONOMIC OPTIMIZATION AND MODEL-BASED CONTROL OF PAPER MACHINES AND OTHER SYSTEMS

(71) Applicant: Honeywell Limited, Mississauga (CA)

(72) Inventor: Michael Forbes, North Vancouver (CA)

(73) Assignee: Honeywell Limited, Mississauga (CA)

( * ) Notice: Subject to any disclaimer, the term of this patent is extended or adjusted under 35 U.S.C. 154(b) by 208 days.

(21) Appl. No.: 15/085,354

(22) Filed: Mar. 30, 2016

(65) Prior Publication Data
US 2016/0378073 A1 Dec. 29, 2016

Related U.S. Application Data

(60) Provisional application No. 62/185,172, filed on Jun. 26, 2015.

(51) Int. Cl.
*G05B 13/02* (2006.01)
*G05B 9/02* (2006.01)

(52) U.S. Cl.
CPC ............ *G05B 13/021* (2013.01); *G05B 9/02* (2013.01)

(58) Field of Classification Search
None
See application file for complete search history.

(56) References Cited

U.S. PATENT DOCUMENTS

| | | | |
|---|---|---|---|
| 4,243,480 A * | 1/1981 | Hernandez | D01F 9/00 162/141 |
| 5,196,997 A | 3/1993 | Kurtzberg et al. | |
| 5,351,184 A | 9/1994 | Lu et al. | |
| 5,394,322 A | 2/1995 | Hansen | |
| 5,561,599 A | 10/1996 | Lu | |
| 5,572,420 A | 11/1996 | Lu | |
| 5,574,638 A | 11/1996 | Lu | |

(Continued)

FOREIGN PATENT DOCUMENTS

| EP | 2172887 A2 | 4/2010 |
|---|---|---|
| WO | WO 2008/139006 A1 | 11/2008 |

OTHER PUBLICATIONS

Precup et al. 'A survey on industrial applications of fuzzy control' Computers in Industry 62 (2011) 213-226.*

(Continued)

*Primary Examiner* — Bernard G Lindsay

(57) ABSTRACT

A method includes executing a control algorithm for an industrial process using a controller objective function, where the industrial process is associated with at least one controlled variable. The method also includes executing an optimization algorithm for the industrial process using an extended version of the controller objective function. The extended version of the controller objective function includes one or more additional terms added to the controller objective function, and one or more results of the optimization algorithm are provided to the control algorithm. The method further includes, based on tracking errors associated with the at least one controlled variable, adjusting at least one adaptive weight parameter in the extended version of the controller objective function. The at least one adaptive weight parameter is associated with at least one of the one or more additional terms.

17 Claims, 2 Drawing Sheets

(56) References Cited

U.S. PATENT DOCUMENTS

| | | | |
|---|---|---|---|
| 5,758,047 | A | 5/1998 | Lu et al. |
| 6,055,483 | A | 4/2000 | Lu |
| 6,122,555 | A | 9/2000 | Lu |
| 6,253,113 | B1 | 6/2001 | Lu |
| 6,697,767 | B2 | 2/2004 | Wang et al. |
| 6,807,510 | B1 | 10/2004 | Backstrom et al. |
| 2002/0111758 | A1 | 8/2002 | Wang et al. |
| 2004/0002786 | A1* | 1/2004 | Sasaki ............... D21F 5/06 700/127 |
| 2004/0049295 | A1* | 3/2004 | Wojsznis ............ G05B 11/32 700/28 |
| 2007/0023931 | A1 | 2/2007 | Chew et al. |
| 2009/0198350 | A1 | 8/2009 | Thiele |
| 2014/0358254 | A1 | 12/2014 | Chu et al. |
| 2015/0073572 | A1* | 3/2015 | Joshi ................. B01D 53/346 700/90 |
| 2015/0268645 | A1 | 9/2015 | Shi et al. |

OTHER PUBLICATIONS

Sildir et al. 'Plant-wide hierarchical optimization and control of an industrial hydrocracking process', Journal of Process Control 23 (2013) 1229-1240.*

The International Searching Authority, "Notification of Transmittal of the International Search Report and the Written Opinion of the International Searching Authority, or the Declaration," International Application No. PCT/CA2016/000171, dated Sep. 15, 2016, 9 pages, publisher the ISA/CA, Canadian Intellectual Property Office, Gatineau, Quebec, Canada.

Maybeck, Peter S., "Stochastic models, estimation and control," vol. 1, Chapter 1, 1979, pp. 1-19, publisher Academic Press Inc., New York, NY.

International Search Report dated Jun. 9, 2015 in connection with International Application No. PCT/CA2015/000146; 3 pages.

Written Opinion of the International Searching Authority dated Jun. 9, 2015 in connection with International Application No. PCT/CA2015/000146; 4 pages.

J.M. Maciejowski; "Predictive Control with Constraints"; Pearson Education Limited; Published 2002; 6 pages.

S.Skogestad and I. Postlethwaite, "Multivariable Feedback Control: Analysis and Design", New York: John Wiley & Sons 1996, 8 pages.

K. Zhou and J.C. Doyle, "Essentials of Robust Control-Linear Fractional Transformation", Englewood Cliffs, New Jersey: Prentice-Hall 1998, 3 pages.

J. Hu, C. Bohn, and H.R. Wu, "Systematic h∞ weighting function selection and its application to the real-time control of a vertical take-off aircraft", Control Engineering Practice, vol. 8, pp. 241-252, 2000, 12 pages.

M.S. Bazaraa, H.D. Sherali, and C.M. Shetty, Nonlinear Programming: Theory and Algorithms, John Wiley & Sons, Inc. 1979, 3 pages.

J.M. Maciejowski, "Predictive Control with Constraints-Reference Trajectory and Pre-Filter", New York: Prentice-Hall 2002, 4 pages.

Danlei Chu et al. "Model Predictive Control and Optimization for Papermaking Processes", Advanced Model Predictive Control, www.intechopen.com, pp. 309-342.

Junqiang Fan et al., "Two-Dimensional Frequency Response Analysis and Insights for Weight Selection in Cross-Directional Model Predictive Control", Proceedings from 42nd IEEE, Maui, Hawaii, USA, Dec. 2003, pp. 3717-3723.

Jorge L. Garriga et al. "Model Predictive Controller Tuning via Eigenvalue Placement", 2008 American Control Conference, Seattle, WA, Jun. 11-13, 2008, pp. 429-434.

C. Mohtadi et al. "Frequency response characteristics of MIMO GPC", Int. J. Control, 1992, vol. 55, No. 4, Taylor & Francis Ltd., p. 877-900.

Camile Rowe et al. "Tuning MPC using H∞ Loop Shaping", American Control Conference—IEEE1216, Chicago, IL, Jun. 2000, pp. 1332-1336.

Gaurang Shah et al. "Tuning MPC for Desired Closed-Loop Performance for MIMO Systems", American Control Conference, San Francisco, CA, Jun. 29-Jul. 1, 2011, pp. 4404-4409.

Stefano D. Cairano et al. "Model Predictive Control Tuning by Controller Matching", IEEE Transactions on Automatic Control, vol. 55, No. 1, Jan. 2010, pp. 185-190.

He Kong et al. "Predictive metamorphic control", www.elsevier.com/locate/automatica, Automatica 49 (2013), pp. 3670-3676.

Jorge L. Garriga et al. "Model Predictive Control Tuning Methods: A Review", American Chemical Society Published on Web Mar. 19, 2010, 49, pp. 3505-3515.

David Angeli et al. "An ellipsoidal off-line MPC scheme for uncertain polytopic discrete-time systems", www.elsevier.com/locate/automatica, Automatica 44—(2008), pp. 3113-3119.

Nikos Vlassis et al. "Polytopic uncertainty for linear systems: New and old complexity results", Luxembourg Centre for Systems Biomedicine, Feb. 12, 2014—13 Pages.

Ning He et al. "User Friendly Robust MPC Tuning of Uncertain Paper-Making Processes", Department of Electrical and Computer Engineering, University of Alberta, Edmonton, Alberta, Canada, Feb. 2015, 6 Pages.

V. M. Alfaro, (Dept of Autom; University of de Costa Rica); 47th IEEE Conferrence on Decision and Control; Date: Dec. 9-11, 2008; Title: Two-Degree-of-Freedom PI/PID Tning Approach for smooth Control on Cascade Control System), 6 pgs.

Ning He et al., "Method and Apparatus for Robust Tuning of Model-Based Process Controllers Used With Uncertain Multiple-Input, Multiple-Output (MIMO) Processes", U.S. Appl. No. 14/729,930, filed Jun. 3, 2015, 41 pgs.

Daniel Chu et al., "Technique for Converting a Model Predictive Control (MPC) System Into an Explicit Two-Degrees of Freedom (2DOF) Control System", U.S. Appl. No. 13/907,495, filed May 31, 2013, 38 pgs.

Dawei Shi et al., "Method and Apparatus for Specifying and Visualizing Robust Tuning of Model-Based Controllers", U.S. Appl. No. 14/314,221, filed Jun. 25, 2014, 48 pgs.

* cited by examiner

LAYERED APPROACH TO ECONOMIC OPTIMIZATION AND MODEL-BASED CONTROL OF PAPER MACHINES AND OTHER SYSTEMS

CROSS-REFERENCE TO RELATED APPLICATION AND PRIORITY CLAIM

This application claims priority under 35 U.S.C. § 119(e) to U.S. Provisional Patent Application No. 62/185,172 filed on Jun. 26, 2015. This provisional patent application is hereby incorporated by reference in its entirety.

TECHNICAL FIELD

This disclosure relates generally to industrial process control and automation systems. More specifically, this disclosure relates to a layered approach to economic optimization and model-based control of paper machines and other systems.

BACKGROUND

Sheets or other webs of material are used in a variety of industries and in a variety of ways. These materials can include paper, multi-layer paperboard, and other products manufactured or processed in long webs. As a particular example, long sheets of paper can be manufactured and collected in reels.

It is often necessary or desirable to measure one or more properties of a web of material as the web is being manufactured or processed. Adjustments can then be made to the manufacturing or processing system to ensure that the web's properties stay at desired setpoints or within desired ranges. Model-based industrial process controllers are routinely used to control the operations of a web manufacturing or processing system. These types of model-based controllers typically use one or more models to mathematically represent how one or more properties of a web respond to changes made to the system.

SUMMARY

This disclosure provides a layered approach to economic optimization and model-based control of paper machines and other systems.

In a first embodiment, a method includes executing a control algorithm for an industrial process using a controller objective function, where the industrial process is associated with at least one controlled variable. The method also includes executing an optimization algorithm for the industrial process using an extended version of the controller objective function. The extended version of the controller objective function includes one or more additional terms added to the controller objective function, and one or more results of the optimization algorithm are provided to the control algorithm. The method further includes, based on tracking errors associated with the at least one controlled variable, adjusting at least one adaptive weight parameter in the extended version of the controller objective function. The at least one adaptive weight parameter is associated with at least one of the one or more additional terms.

In a second embodiment, an apparatus includes at least one memory configured to store a controller objective function and an extended version of the controller objective function. The extended version of the controller objective function includes one or more additional terms added to the controller objective function. The apparatus also includes at least one processor configured to execute a control algorithm for an industrial process using the controller objective function, where the industrial process is associated with at least one controlled variable. The at least one processor is also configured to execute an optimization algorithm for the industrial process using the extended version of the controller objective function. The at least one processor is further configured to provide one or more results of the optimization algorithm to the control algorithm. In addition, the at least one processor is configured, based on tracking errors associated with the at least one controlled variable, to adjust at least one adaptive weight parameter in the extended version of the controller objective function. The at least one adaptive weight parameter is associated with at least one of the one or more additional terms.

In a third embodiment, a non-transitory computer readable medium contains instructions that, when executed by at least one processor, cause the at least one processor to execute a control algorithm for an industrial process using a controller objective function, where the industrial process is associated with at least one controlled variable. The medium also contains instructions that, when executed by the at least one processor, cause the at least one processor to execute an optimization algorithm for the industrial process using an extended version of the controller objective function. The extended version of the controller objective function includes one or more additional terms added to the controller objective function. The medium further contains instructions that, when executed by the at least one processor, cause the at least one processor to provide one or more results of the optimization algorithm to the control algorithm. In addition, the medium contains instructions that, when executed by the at least one processor, cause the at least one processor, based on tracking errors associated with the at least one controlled variable, to adjust at least one adaptive weight parameter in the extended version of the controller objective function. The at least one adaptive weight parameter is associated with at least one of the one or more additional terms.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
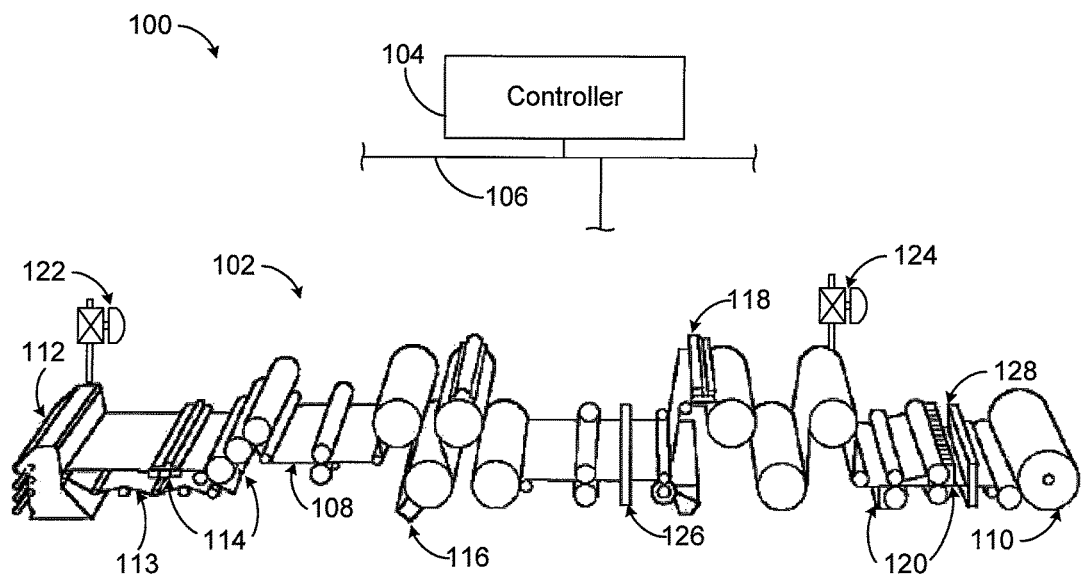
FIG. 1 illustrates an example web manufacturing or processing system according to this disclosure.
Figure 2:
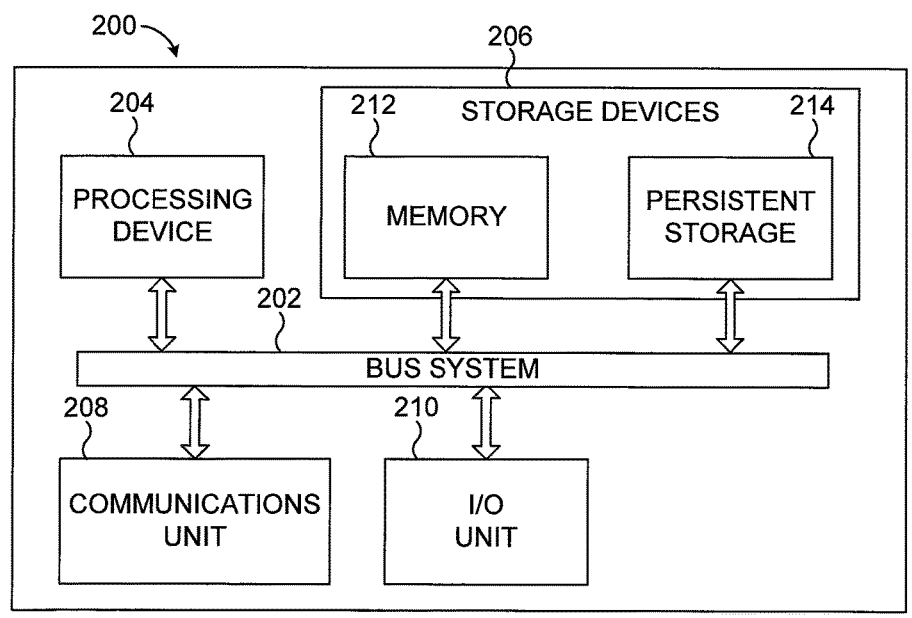
FIG. 2 illustrates an example model-based process controller according to this disclosure.
Figure 3:
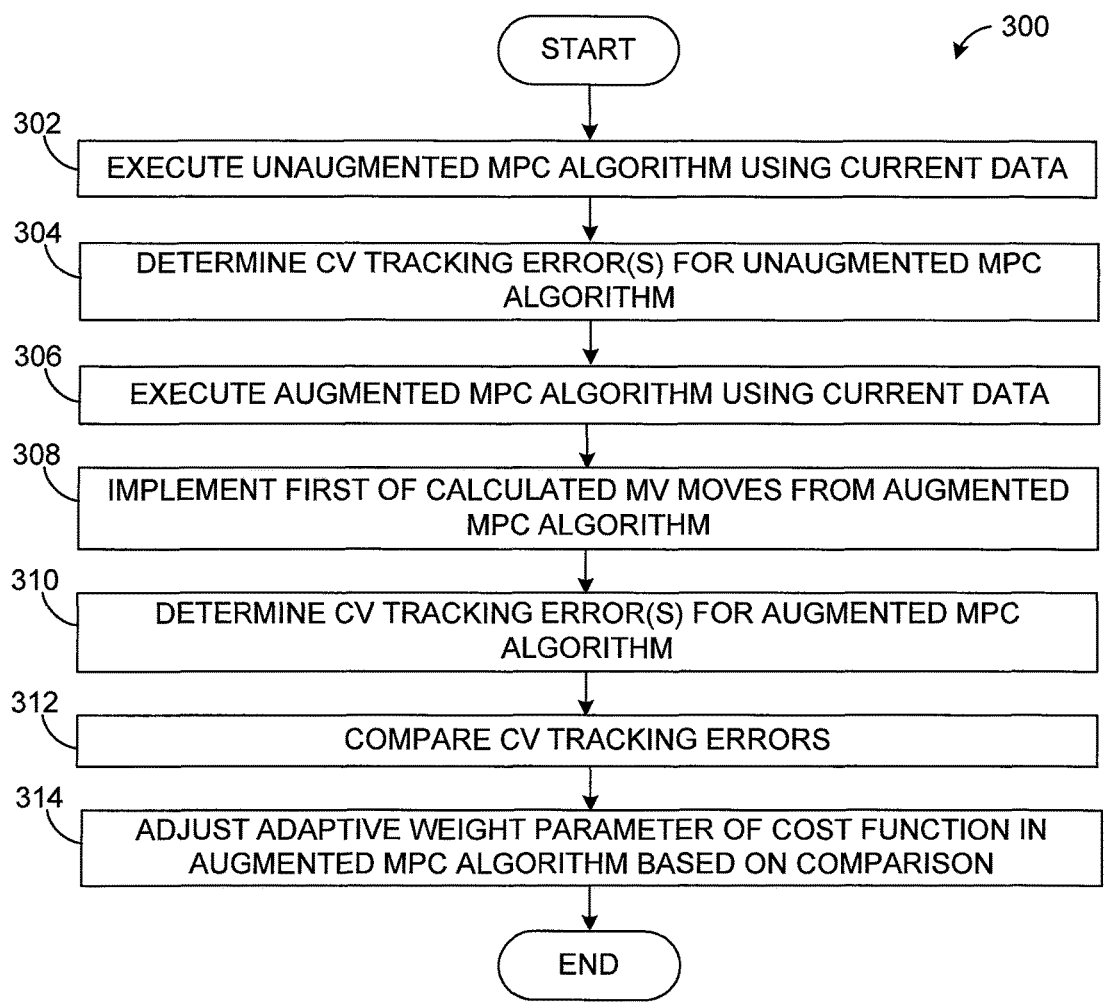
FIG. 3 illustrates an example method for using a layered approach to economic optimization and model-based control of paper machines and other systems according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example web manufacturing or processing system 100 according to this disclosure. As shown in FIG. 1, the system 100 includes a paper machine 102, a controller 104, and a network 106. The paper machine 102 includes various components used to produce a paper product, namely a paper web 108 that is collected at a reel 110. The controller 104 monitors and controls the operation of the paper machine 102, which may help to maintain or increase the quality of the paper web 108 produced by the paper machine 102. The machine direction (MD) of the web 108 denotes the direction along the (longer) length of the web 108, while the cross direction (CD) of the web 108 denotes the direction along the (shorter) width of the web 108.

In this example, the paper machine 102 includes at least one headbox 112, which distributes a pulp suspension uniformly across the machine onto a continuous moving wire screen or mesh 113. The pulp suspension entering the headbox 112 may contain, for example, 0.2-3% wood fibers, fillers, and/or other materials, with the remainder of the suspension being water.

Arrays of drainage elements 114, such as vacuum boxes, remove as much water as possible to initiate the formation of the web 108. An array of steam actuators 116 produces hot steam that penetrates the paper web 108 and releases the latent heat of the steam into the paper web 108. An array of rewet shower actuators 118 adds small droplets of water (which may be air atomized) onto the surface of the paper web 108. The paper web 108 is then often passed through a calender having several nips of counter-rotating rolls. Arrays of induction heating actuators 120 heat the shell surfaces of various ones of these rolls.

Two additional actuators 122-124 are shown in FIG. 1. A thick stock flow actuator 122 controls the consistency of incoming stock received at the headbox 112. A steam flow actuator 124 controls the amount of heat transferred to the paper web 108 from drying cylinders. The actuators 122-124 could, for example, represent valves controlling the flow of stock and steam, respectively. These actuators may be used for controlling the dry weight and moisture of the paper web 108. Additional flow actuators may be used to control the proportions of different types of pulp and filler material in the thick stock and to control the amounts of various additives (such as retention aid or dyes) that are mixed into the stock.

This represents a brief description of one type of paper machine 102 that may be used to produce a paper product. Additional details regarding this type of paper machine 102 are well-known in the art and are not needed for an understanding of this disclosure.

In order to control the paper-making process, one or more properties of the paper web 108 may be continuously or repeatedly measured. The web properties can be measured at one or various stages in the manufacturing process. This information may then be used to adjust the paper machine 102, such as by adjusting various actuators within the paper machine 102. This may help to compensate for any variations of the web properties from desired targets, which may help to ensure the quality of the web 108.

As shown in FIG. 1, the paper machine 102 includes one or more scanners 126-128, each of which may include one or more sensors. Each scanner 126-128 is capable of measuring one or more characteristics of the paper web 108. For example, each scanner 126-128 could include sensors for measuring the tension, caliper, moisture, anisotropy, basis weight, color, gloss, sheen, haze, surface features (such as roughness, topography, or orientation distributions of surface features), or any other or additional characteristics of the paper web 108.

Each scanner 126-128 includes any suitable structure or structures for measuring or detecting one or more characteristics of the paper web 108, such as one or more sets of sensors. The use of scanners represents one particular embodiment for measuring web properties. Other embodiments could be used, such as those including one or more stationary sets or arrays of sensors, deployed in one or a few locations across the web or deployed in a plurality of locations across the whole width of the web such that substantially the entire web width is measured.

The controller 104 receives measurement data from the scanners 126-128 and uses the data to control the paper machine 102. For example, the controller 104 may use the measurement data to adjust any of the actuators or other components of the paper machine 102. The controller 104 includes any suitable structure for controlling the operation of at least part of the paper machine 102, such as a computing device. Note that while a single controller 104 is shown here, multiple controllers 104 could be used, such as different controllers that control different variables of the web.

The network 106 is coupled to the controller 104 and various components of the paper machine 102 (such as the actuators and scanners). The network 106 facilitates communication between components of the system 100. The network 106 represents any suitable network or combination of networks facilitating communication between components in the system 100. The network 106 could, for example, represent a wired or wireless Ethernet network, an electrical signal network (such as a HART or FOUNDATION FIELDBUS network), a pneumatic control signal network, or any other or additional network(s).

The controller(s) 104 can operate to control one or more aspects of the paper machine 102 using one or more models. For example, each model could associate one or more manipulated variables with one or more controlled variables. A controlled variable (CV) generally represents a variable that can be measured or inferred and that is ideally controlled to be at or near a desired setpoint or within a desired range of values. The controlled variables typically include one or more properties of the web 108. A manipulated variable (MV) generally represents a variable that can be adjusted in order to alter one or more controlled variables. The manipulated variables typically include setpoints, settings, or other values used by various actuators in the system 100.

Model-based predictive controllers, such as model predictive control (MPC) controllers, typically operate to find changes to process inputs (MVs) that minimize a weighted quadratic cost of those moves plus a weighted quadratic cost of predicted deviations of product quality variables or other process outputs (CVs) from targets for a future time period. These quadratic costs are often defined in an objective cost function, and a control solution can be identified that minimizes the objective cost function. This minimization is subject to limits and move size constraints on the process input moves. These types of controllers can therefore provide an optimal solution for tracking pre-determined process output targets. However, in many cases, it is also desired to optimize the process output targets themselves, to include process input targets in the objective cost function, or to minimize or maximize process inputs or outputs for process economic purposes. In general, as long as the number of unsaturated manipulated variables exceeds the number of controlled variables, some form of economic optimization can typically be included in the objective cost function and used when calculating control solutions for an industrial process being controlled.

One basic approach to performing this economic optimization is to include additional linear and quadratic terms in the objective cost function and then solve the extended problem. For example, assume the following model represents the process behavior of an industrial system:

$$x(k+1)=Ax(k)+B\Delta u(k)$$

$$y(k+1)=Cx(k+1) \quad (1)$$

Here, x is the internal state of the process, u is the process input, and y is the measured process output. Also, A, B, and C are matrices of constant values determining the behavior of the process. In addition, k is a time index. If the time at index k is $t_k$, then $t_{k+1}=t_k+dt$, where dt is the constant time step between time indices For this system, a standard objective cost function used for MPC could be expressed as follows:

$$J = \sum_{i=1}^{H_p} (y(k+i) - y_{ref}(k+i))^T \tilde{Q}_1 (y(k+i) - y_{ref}(k+i)) + \quad (2)$$

$$\sum_{i=1}^{H_u} (\Delta u(k+i-1))^T \tilde{Q}_2 \Delta u(k+i-1) +$$

$$\sum_{i=1}^{H_u} (u(k+i-1) - u_{ref}(k+i-1))^T \tilde{Q}_3 (u(k+i-1) - u_{ref}(k+i-1))$$

Here, $H_p$ is the predictive horizon or number of time steps into the future for which the process output tracking error is predicted. Also, $H_u$ is the control horizon or number of time steps into the future for which control moves may be planned. Further, $y_{ref}$ is a target trajectory for the process output over the prediction horizon, and $u_{ref}$ is a target trajectory for the process input over the control horizon. In addition, the Q matrices and factors are used to weight different costs associated with terms in the cost function J.

A control solution for controlling this system can be calculated by solving:

$$\min_{\{\Delta u\}} J \quad (3)$$

s.t.

$$u \le \overline{u}$$

$$u \ge \underline{u}$$

$$|\Delta u| \le \overline{\Delta u}$$

where $\overline{u}$ implies a maximum value and $\underline{u}$ implies a minimum value. One approach to providing economic optimization is to include additional linear and quadratic terms in the cost function of Equation (2) as follows.

$$J = \sum_{i=1}^{H_p} (y(k+i) - y_{ref}(k+i))^T \tilde{Q}_1 (y(k+i) - y_{ref}(k+i)) + \quad (4)$$

-continued $$\sum_{i=1}^{H_u} (\Delta u(k+i-1))^T \tilde{Q}_2 \Delta u(k+i-1) +$$

$$\sum_{i=1}^{H_u} (u(k+i-1) - u_{ref}(k+i-1))^T$$

$$\tilde{Q}_3 (u(k+i-1) - u_{ref}(k+i-1)) + \sum_{i=1}^{H_u} (u_{ref}(k+i-1))^T \tilde{q}_4$$

The additional term at the end of Equation (4) provides the ability for economic optimization.

One advantage of this approach is that the extended problem can be solved using the same quadratic programming (QP) solver that is used for the original control problem. However, this modification of the cost function requires a trade-off between process output target tracking and overall extended cost, which means that the extended objective function in Equation (4) may not be as effective in keeping controlled variables at their desired setpoints or within desired ranges. This may be acceptable in some cases. Unfortunately, in other cases, plant operations might dictate that the additional optimization should not come at the expense of minimizing deviations of process outputs from targets (regulatory control). Moreover, the extended objective function in Equation (4) does not promote monotonicity of movements in manipulated variables towards their optimum values. In addition, the extended objective function in Equation (4) requires deep integration of the economic optimization with the control problem itself, making it harder to troubleshoot or change the economic optimization or the control problem in the future.

This disclosure provides techniques for economically optimizing an industrial process without modifying the objective function or minimization problem used by a process controller. Instead, a separate layer can be created and used to support economic optimization in conjunction with the objective function and minimization problem used by the process controller. The separate layer for economic optimization can be used to pre-determine $u_{ref}$ and $y_{ref}$ values at each update of the control algorithm, where $u_{ref}$ and $y_{ref}$ denote input and output target values for the controller's optimization problem.

In this way, the disclosed techniques for economically optimizing an industrial process can be performed without creating a trade-off with process output target tracking. These techniques also need not require advanced optimization beyond a standard quadratic programming solver, which can lower the technical risk for implementation. These techniques solve the problem of economic process optimization without causing significant (or any) process output tracking errors by taking a two-stage approach. In the first stage, a control solution is obtained for an original cost function. Predicted process output deviations from specified targets for this initial solution are saved for use in the second stage. In the second stage, an extended control solution is obtained for an extended problem, which economically optimizes the process. The economically optimized process inputs are used to control the industrial process.

In some embodiments, predicted process output deviations from specified targets for the second stage solution are compared to those that were saved from the first stage solution. If the process output deviations from the targets are greater for the second stage solution (within some tolerance), weights on the additional terms that were added to the second stage cost function can be reduced for the next time the control solution is calculated. In this way, the additional terms in the cost function are de-emphasized in each successive control calculation until the process can be economically optimized without causing any significant degradation to process output target tracking. This approach could be referred to as an "adaptive cost function" technique because the reduction (and possible inflation) of the weightings on the additional cost function terms are based on the amount of output target tracking error and are used to adapt the economic cost function to ensure that process target tracking requirements are not violated.

In particular embodiments, the first stage of the adaptive cost function technique operates using the cost function shown in Equation (2) above, and the second stage of the adaptive cost function technique uses an objective cost function as follows:

$$J = \sum_{i=1}^{H_p} (y(k+i) - y_{ref}(k+i))^T \tilde{Q}_1 (y(k+i) - y_{ref}(k+i)) + \qquad (5)$$

$$\sum_{i=1}^{H_u} (\Delta u(k+i-1))^T \tilde{Q}_2 \Delta u(k+i-1) +$$

$$\sum_{i=1}^{H_u} (u(k+i-1) - u_{ref}(k+i-1))^T$$

$$\tilde{Q}_3 (u(k+i-1) - u_{ref}(k+i-1)) + \sum_{i=1}^{H_u} (u_{ref}(k+i-1))^T \left(\frac{\tilde{q}_4}{\lambda}\right)$$

Here, λ denotes a weighting factor that is used to control the amount of economic optimization provided by the objective function in Equation (5).

Additional details regarding one specific implementation of this technique are provided below. Note that this approach can be applied to any suitable industrial process where optimization occurs in conjunction with model-based process control, such as for MD control of one or more web properties in a paper machine.

Depending on the implementation, the disclosed techniques for economically optimizing an industrial process can provide one, some, or all of the following advantages. For example, the economic optimization need not occur at the expense of regulatory control. This means the economic optimization can result in little or minimum dynamic deviation of controlled variables from their setpoints, and there may be little or no increase in steady-state offset of the controlled variables from their setpoints (in most cases, the offset could be zero). Also, the optimizer performing the economic optimization may be efficient and reliable. Further, the optimization could be tunable to promote near monotonic movement of the manipulated variables. As a particular example, when maximizing the machine speed of the paper machine 102, the machine speed could increase monotonically until a drying capacity (steam flow) saturates. Non-monotonic movement may be interpreted by an operator as incorrect operation of the industrial process. Finally, code for the optimization may be more easily maintainable, and the code could be simpler to understand when optimization and control are not deeply integrated into the same algorithm.

Although FIG. 1 illustrates one example of a web manufacturing or processing system 100, various changes may be made to FIG. 1. For example, other systems could be used to produce other paper or non-paper products, and the layered approach for providing both model-based process control and economic optimization could be used with those systems. Also, while shown as including a single paper machine 102 with various components and a single controller 104, the system 100 could include any number of paper machines or other machinery having any suitable structure, and the system 100 could include any number of controllers. In addition, FIG. 1 illustrates one example operational environment in which a layered approach for providing both model-based process control and economic optimization can be used. This functionality could be used in any other suitable system.

FIG. 2 illustrates an example model-based process controller 200 according to this disclosure. The device 200 could, for example, represent the controller 104 in the system 100 of FIG. 1. However, the device 200 could be used in any other suitable system, and the controller 104 could be implemented in any other suitable manner.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface card that facilitates communications over at least one Ethernet network, electrical signal network, or other type(s) of network(s). The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

When implementing the controller 104, one or more models associated with the paper machine 102 or other industrial process could be stored in one or more of the storage devices 206. Also, various algorithms could be executed by the processing device 204 to implement the layered approach to economic optimization and model-based process control described in this patent document.

Although FIG. 2 illustrates one example of a model-based process controller 200, various changes may be made to FIG. 2. For example, various components in FIG. 2 could be combined, further subdivided, rearranged, or omitted and additional components could be added according to particular needs. Also, computing devices can come in a wide variety of configurations, and FIG. 2 does not limit this disclosure to any particular configuration of computing device.

FIG. 3 illustrates an example method 300 for using a layered approach to economic optimization and model-based control of paper machines and other systems according to this disclosure. For ease of explanation, the method 300 is described below as being performed by the controller 104 in the system 100 of FIG. 1, where the controller 104 is implemented using the controller 200 of FIG. 2. However, the method 300 could be used by any suitable device and in any suitable system.

As shown in FIG. 3, an unaugmented model-based control algorithm (such as a standard MPC algorithm) is executed using current process data at step 302. This could include, for example, the processing device 204 of the controller 104 using current sensor or other data associated with the paper machine 102 while finding a solution to the cost function in Equation (2) using the approach shown in Equation (3). It is assumed here that the values of $u_{ref}$ and $y_{ref}$ remain unchanged. In particular embodiments, this could be accomplished using a standard QP solver.

One or more tracking errors associated with one or more controlled variables are determined for the unaugmented model-based control algorithm at step 304. This could include, for example, the processing device 204 of the controller 104 identifying one or more values $y^*(k+H_p)$, which denote one or more predicted values of one or more controlled variables at the end of a prediction horizon. In other words, these values denote a prediction of where the controlled variables will be without any economic optimization being performed. The processing device 204 of the controller 104 can identify any difference between the predicted values of the controlled variables and the desired setpoints of the controlled variables to identify the tracking errors for those controlled variables.

An augmented model-based control algorithm (such as an augmented MPC algorithm) is executed using current process data at step 306. This could include, for example, the processing device 204 of the controller 104 using current sensor or other data associated with the paper machine 102 while finding a solution to the cost function in Equation (5) using the following approach:

$$\min_{\{\Delta u, \Delta u_{ref}, \Delta y_{ref}\}} J \quad (6)$$

s.t.

$u \leq \bar{u}$ $u \geq \underline{u}$ $|\Delta u| \leq \overline{\Delta u}$ $u_{ref} \leq \bar{u}$ $u_{ref} \geq \underline{u}$ $|\Delta u_{ref}| \leq \overline{\Delta u}$ $y_{ref} \leq \bar{y}$ $y_{ref} \geq \underline{y}$ Again, in particular embodiments, this could be accomplished using a standard QP solver with the new objective function in Equation (5) and the new control problem in Equation (6). The results of this step typically include new controlled variable and manipulated variable targets and a series of potential changes to one or more manipulated variables.

A first change to the one or more manipulated variables calculated by the augmented model-based control algorithm is implemented at step 308. This could include, for example, the processing device 204 of the controller 104 generating one or more control signals and outputting the one or more control signals to one or more actuators. This causes an adjustment to or change in the actual underlying industrial process being controlled.

One or more tracking errors associated with the one or more controlled variables are determined for the augmented model-based control algorithm at step 310. This could include, for example, the processing device 204 of the controller 104 identifying one or more values $y^{**}(k+H_p)$ for the augmented model-based control algorithm, which denote one or more predicted values of the one or more controlled variables at the end of the prediction horizon. The processing device 204 of the controller 104 can identify any difference between the predicted values of the controlled variables and the desired setpoints of the controlled variables to identify the tracking errors for those controlled variables.

The tracking errors for the augmented and unaugmented model-based control algorithms are compared at step 312, and at least one adaptive weight parameter of the cost function in the augmented model-based control algorithm is adjusted (if necessary) based on the comparison at step 314. This could include, for example, the processing device 204 of the controller 104 identifying whether the augmented model-based control algorithm achieves smaller tracking errors than the unaugmented model-based control algorithm. This could also include the processing device 204 of the controller 104 decreasing the weighting factor λ when the augmented model-based control algorithm achieves smaller tracking errors than the unaugmented model-based control algorithm. This could further include the processing device 204 of the controller 104 increasing the weighting factor λ when the augmented model-based control algorithm achieves larger tracking errors than the unaugmented model-based control algorithm.

In particular embodiments, steps 312-314 of the method 300 could occur as follows. The comparison of the tracking errors from the augmented and unaugmented model-based control algorithms can take the form:

$$\|y^{}(k+H_p)-y_{ref}^{}(k+H_p)\|_{Q_1}^2 > \|y^*(k+H_p)-y_{ref}(k+H_p)\|_{Q_i}^2 \quad (7)$$

Here, $y^{}$ is the predicted process output at the control horizon for the augmented algorithm, $y_{ref}^{}$ is the optimized output reference trajectory at the control horizon for the augmented algorithm, and $y^*$ is the predicted process output at the control horizon for the unaugmented algorithm. If the condition in Equation (7) is true, the augmented model-based control algorithm achieves larger tracking errors than the unaugmented model-based control algorithm. In this case, the weighting factor λ could be adjusted as follows:

$$\lambda = \gamma\lambda \quad (8)$$

If the condition in Equation (7) is false, the augmented model-based control algorithm achieves smaller tracking errors than the unaugmented model-based control algorithm. In that case, the weighting factor λ could be adjusted as follows:

$$\lambda = \max\left(\frac{\lambda}{\gamma}, 1\right) \quad (9)$$

Here, $\lambda$ denotes a value larger than one. Equation (9) is designed to limit the weighting factor $\lambda$ so that the weighting factor $\lambda$ never becomes less than one, although other values could also be used. Through this process, the weighting factor $\lambda$ can be gradually decreased when economic optimization is beneficial (does not interfere with regulatory control) and gradually increased when economic optimization is not beneficial (does interfere with regulatory control). The weighting factor $\lambda$ therefore helps to moderate or control the use of economic terms in the objective cost function during future iterations of the control algorithm.

The entire process shown in FIG. 3 denotes one iteration of the overall control algorithm for the controller 104. The method 300 could be repeated any number of times, such as a specified interval, to provide control of the underlying industrial process during any number of control iterations.

As can be seen here, the economic optimization is effectively added as a layer on top of the standard controller algorithm, so there is no deep integration of the optimization functionality with the controller algorithm. The controller itself may be left unchanged, and the optimizer may simply send new controlled and manipulated variable targets to the controller. The use of the modified extended cost function helps to prevent trade-offs between control quality and optimization since the adaptive weighting in the extended cost function can reduce the effects of the economic optimization on regulatory control. In addition, the optimization here can often be performed using QP solvers that are standard in process controllers, enabling simpler implementation of this approach within an industrial control and automation system.

Although FIG. 3 illustrates one example of a method 300 for using a layered approach to economic optimization and model-based control of paper machines and other systems, various changes may be made to FIG. 3. For example, while shown as a series of steps, various steps in FIG. 3 could overlap, occur in parallel, occur in a different order, or occur any number of times. Also, while specific functions, equations, or algorithms are described above, a number of cost functions, solutions for cost functions, and mechanisms for controlling the weight(s) of economic terms in cost functions could be used.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C.

None of the description in this application should be read as implying that any particular element, step, or function is an essential element that must be included in the claim scope. The scope of patented subject matter is defined only by the claims. Moreover, none of the claims invokes 35 U.S.C. § 112(f) unless the exact words "means for" or "step for" are followed by a participle.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for optimization and model-based control of a paper-making process, the method comprising:

receiving at least one controlled variable of a paper web from a sensor of a plurality of sensors and actuators deployed in one or more locations across the paper web in the paper-making process, wherein the at least one controlled variable is includes one or more measurements of tension, caliper, moisture, anisotropy, basis weight, color, gloss, sheen, haze, and surface features of the paper web;

generating a control tracking error using a control algorithm for the paper-making process using a controller objective function and at least one controlled variable target, wherein the control tracking error is the difference between a predicted value of the at least one controlled variable and a set point for the at least one controlled variable;

implementing the at least one controlled variable target through the plurality of sensors and actuators of the paper-making process;

optimizing the control tracking error by executing an optimization algorithm for the paper-making process using an extended version of the controller objective function, the extended version of the controller objective function including one or more additional terms added to the controller objective function, wherein the optimization tracking error of the optimization algorithm is provided to the control algorithm;

based on the control tracking error and the optimization tracking error associated with the at least one controlled variable, adjusting at least one adaptive weight parameter in the extended version of the controller objective function, the at least one adaptive weight parameter associated with at least one of the one or more additional terms, wherein each tracking error represents a difference between (i) a predicted value of a specific controlled variable at an end of a prediction horizon and (ii) a target value for the specific controlled variable; and controlling a component of the paper-making process using the at least one adaptive weight parameter.

2. The method of claim 1, wherein:

the control algorithm and the optimization algorithm are repeatedly executed during multiple control iterations; and the at least one adaptive weight parameter as adjusted during one control iteration is used during execution of the optimization algorithm in a subsequent control iteration.

3. The method of claim 1, wherein adjusting the at least one adaptive weight parameter comprises:

increasing a weight placed on the at least one of the one or more additional terms when the optimization algorithm achieves a smaller tracking error than the control algorithm; and decreasing the weight placed on the at least one of the one or more additional terms when the optimization algorithm achieves a larger tracking error than the control algorithm.

4. The method of claim 1, wherein the at least one adaptive weight parameter is adjusted so that the at least one of the one or more additional terms is de-emphasized until the paper-making process is economically optimized without causing any degradation to process output target tracking.

5. The method of claim 1, wherein the one or more results of the optimization algorithm comprise at least one input target value and at least one output target value.

6. The method of claim 1, further comprising:

generating and outputting at least one control signal, the at least one control signal adjusting an operation of the paper-making process.

7. An apparatus for optimization and model-based control of a paper-making process, the apparatus comprising:

at least one memory configured to store a controller objective function and an extended version of the controller objective function, the extended version of the controller objective function including one or more additional terms added to the controller objective function; and at least one processor configured to:

receive at least one controlled variable from a sensor of a plurality of sensors and actuators deployed in one or more locations across the paper web in the paper-making process, wherein the at least one controlled variable includes one or more measurements of tension, caliper, moisture, anisotropy, basis weight, color, gloss, sheen, haze, surface features of the paper web;

generate a control tracking error by using a control algorithm for the paper-making process using the controller objective function resulting in at least one controlled variable target wherein the control tracking error is the difference between a predicted value of the at least one controlled variable and a set point for the at least one controlled variable;

implement the at least one controlled variable target through the plurality of sensors and actuators of the paper-making process;

optimize the control tracking error by executing an optimization algorithm for the paper-making process using the extended version of the controller objective function resulting in an optimization tracking error;

provide the optimized tracking error of the optimization algorithm to the control algorithm; and based on the control tracking error and the optimization tracking error associated with the at least one controlled variable, adjust at least one adaptive weight parameter in the extended version of the controller objective function, the at least one adaptive weight parameter associated with at least one of the one or more additional terms, wherein each tracking error represents a difference between (i) a predicted value of a specific controlled variable at an end of a prediction horizon and (ii) a target value for the specific controlled variable; and control a component of the paper-making process using that at least one adaptive weight parameter.

8. The apparatus of claim 7, wherein:

the at least one processor is configured to repeatedly execute the control algorithm and the optimization algorithm during multiple control iterations; and the at least one processor is configured to use the at least one adaptive weight parameter as adjusted during one control iteration during execution of the optimization algorithm in a subsequent control iteration.

9. The apparatus of claim 7, wherein the at least one processor is configured to:

increase a weight placed on the at least one of the one or more additional terms when the optimization algorithm achieves a smaller tracking error than the control algorithm; and decrease the weight placed on the at least one of the one or more additional terms when the optimization algorithm achieves a larger tracking error than the control algorithm.

10. The apparatus of claim 7, wherein the at least one processor is configured to adjust the at least one adaptive weight parameter so that the at least one of the one or more additional terms is de-emphasized until the paper-making process is economically optimized without causing any degradation to process output target tracking.

11. The apparatus of claim 7, wherein the one or more results of the optimization algorithm comprise at least one input target value and at least one output target value.

12. The apparatus of claim 7, wherein the at least one processor is further configured to generate and output at least one control signal configured to adjust an operation of the paper-making process.

13. A non-transitory computer readable medium containing instructions that, when executed by at least one processor, cause the at least one processor to:

receive at least one controlled variable of a paper web from a sensor of a plurality of sensors and actuators deployed in one or more locations across the paper web in the paper-making process, wherein the at least one controlled variable includes one or more measurements of tension, caliper, moisture, anisotropy, basis weight, color, gloss, sheen, haze, surface features of the paper web;

generate a control tracking error using a control algorithm for the paper-making process using a controller objective function resulting in at least one controlled variable target, wherein the control tracking error is the difference between a predicted value of the at least one controlled variable and a set point for the at least one controlled variable;

implement the at least one controlled variable target through the plurality of sensors and actuators of the paper-making process;

optimize the control tracking error by executing an optimization algorithm for the paper-making process using an extended version of the controller objective function resulting in an optimization tracking error, the extended version of the controller objective function including one or more additional terms added to the controller objective function;

provide the optimization tracking error of the optimization algorithm to the control algorithm; and based on the control tracking error and the optimization tracking error associated with the at least one controlled variable, adjust at least one adaptive weight parameter in the extended version of the controller objective function, the at least one adaptive weight parameter associated with at least one of the one or more additional terms, wherein each tracking error represents a difference between (i) a predicted value of a specific controlled variable at an end of a prediction horizon and (ii) a target value for the specific controlled variable; and control a component of the paper-making process using the at least one adaptive weight parameter.

14. The non-transitory computer readable medium of claim 13, wherein:

the instructions when executed cause the at least one processor to repeatedly execute the control algorithm and the optimization algorithm during multiple control iterations; and the at least one adaptive weight parameter as adjusted during one control iteration is used during execution of the optimization algorithm in a subsequent control iteration.

15. The non-transitory computer readable medium of claim 13, wherein the instructions that when executed cause the at least one processor to adjust the at least one adaptive weight parameter comprise:

instructions that when executed cause the at least one processor to increase a weight placed on the at least one of the one or more additional terms when the optimization algorithm achieves a smaller tracking error than the control algorithm; and instructions that when executed cause the at least one processor to decrease the weight placed on the at least one of the one or more additional terms when the optimization algorithm achieves a larger tracking error than the control algorithm.

16. The non-transitory computer readable medium of claim 13, wherein the instructions that when executed cause the at least one processor to adjust the at least one adaptive weight parameter so that the at least one of the one or more additional terms is de-emphasized until the paper-making process is economically optimized without causing any degradation to process output target tracking.

17. The non-transitory computer readable medium of claim 13, wherein the one or more results of the optimization algorithm comprise at least one input target value and at least one output target value.

* * * * *